(12) United States Patent
Hong et al.

(10) Patent No.: US 9,228,046 B2
(45) Date of Patent: Jan. 5, 2016

(54) LOW GLOSS THERMOPLASTIC RESIN COMPOSITION WITH SOFT TOUCH SURFACE AND MOLDED ARTICLE THEREFROM

(75) Inventors: Jae Keun Hong, Uiwang-si (KR); Hwan Seok Park, Uiwang-si (KR); Byeong Do Lee, Uiwang-si (KR); Young Sub Jin, Uiwang-si (KR); Ho Ryong Sun, Uiwang-si (KR); Sung Kwan Kim, Uiwang-si (KR); Young Don Yoo, Uiwang-si (KR)

(73) Assignee: Cheil Industries Inc., Gum-si (KR)

( * ) Notice: Subject to any disclaimer, the term of this patent is extended or adjusted under 35 U.S.C. 154(b) by 674 days.

(21) Appl. No.: 12/826,992

(22) Filed: Jun. 30, 2010

(65) Prior Publication Data

US 2010/0331475 A1 Dec. 30, 2010

Related U.S. Application Data

(63) Continuation-in-part of application No. PCT/KR2008/007761, filed on Dec. 29, 2008.

(30) Foreign Application Priority Data

Dec. 31, 2007 (KR) .................. 10-2007-0141540
Dec. 19, 2008 (KR) .................. 10-2008-0130541

(51) Int. Cl.

| | |
|---|---|
| *C08F 279/02* | (2006.01) |
| *C08F 279/04* | (2006.01) |
| *C08L 55/02* | (2006.01) |
| *C08L 25/12* | (2006.01) |
| *C08L 33/18* | (2006.01) |

(52) U.S. Cl.
CPC ............. *C08F 279/02* (2013.01); *C08F 279/04* (2013.01); *C08L 55/02* (2013.01); *C08L 25/12* (2013.01); *C08L 33/18* (2013.01); *C08L 2205/02* (2013.01); *C08L 2205/03* (2013.01)

(58) Field of Classification Search
CPC ....... C08F 279/02; C08F 279/04; C08L 55/02
USPC ......................................... 525/71
See application file for complete search history.

(56) References Cited

U.S. PATENT DOCUMENTS

| | | | |
|---|---|---|---|
| 4,362,850 A * | 12/1982 | Burk .............................. | 525/316 |
| 4,652,614 A | 3/1987 | Eichenauer et al. | |
| 4,668,737 A | 5/1987 | Eichenauer et al. | |
| 4,713,420 A | 12/1987 | Henton | |
| 5,237,004 A | 8/1993 | Wu et al. | |
| 5,475,053 A | 12/1995 | Niessner et al. | |
| 5,605,963 A | 2/1997 | Leitz et al. | |
| 5,883,190 A | 3/1999 | Eichenauer | |
| 6,727,319 B2 | 4/2004 | Eichenauer | |

FOREIGN PATENT DOCUMENTS

| | | |
|---|---|---|
| EP | 0154244 A2 | 9/1985 |
| EP | 0668319 A1 | 8/1995 |
| JP | 3673084 A | 1/2000 |
| JP | 2000-141322 A | 5/2000 |
| KR | 10-0364232 B | 2/2003 |
| KR | 10-0397465 B | 2/2004 |
| KR | 10-0612996 B | 8/2006 |
| WO | 03/025061 A2 | 3/2003 |
| WO | 2009/084897 A2 | 7/2009 |

OTHER PUBLICATIONS

International Search Report in counterpart International Application No. PCT/KR2008/007761, dated Jul. 30, 2009.
European Search Report in counterpart European Application No. 08869081 dated Jun. 6, 2011, pp. 1-6.

* cited by examiner

*Primary Examiner* — Peter D Mulcahy
(74) *Attorney, Agent, or Firm* — Additon, Higgins & Pendleton, P.A.

(57) ABSTRACT

Disclosed herein is a low gloss thermoplastic resin composition with a soft touch surface comprising (A) about 10 to about 80% by weight of a soft rubbery aromatic vinyl copolymer resin which comprises rubber particles with a graft ratio of about 40 to about 90% and an average particle diameter of about 6 to about 20 μm as a dispersed phase; (B) about 4 to about 60% by weight of a rubber-modified aromatic vinyl copolymer resin; and (C) about 5 to about 80% by weight of an aromatic vinyl-vinyl cyanide copolymer resin. The molded article molded from the thermoplastic resin composition can have a soft touch surface as well as excellent low gloss and impact strength.

18 Claims, 4 Drawing Sheets

LOW GLOSS THERMOPLASTIC RESIN COMPOSITION WITH SOFT TOUCH SURFACE AND MOLDED ARTICLE THEREFROM

CROSS-REFERENCE TO RELATED APPLICATIONS

This application is a continuation-in-part of International Application No. PCT/KR2008/007761, filed Dec. 29, 2008, pending, which designates the U.S., published as WO 2009/084897, and is incorporated herein by reference in its entirety, and claims priority therefrom under 35 USC Section 120. This application also claims priority under 35 USC Section 119 from Korean Patent Application No. 10-2007-0141540, filed Dec. 31, 2007, in the Korean Intellectual Property Office, and Korean Patent Application No. 10-2008-0130541, filed Dec. 19, 2008, in the Korean Intellectual Property Office, the entire disclosure of each of which is also incorporated herein by reference.

FIELD OF THE INVENTION

The present invention relates to a low gloss thermoplastic resin composition that can have a soft touch surface and an article molded therefrom.

BACKGROUND OF THE INVENTION

Generally, ABS (acrylonitrile-butadiene-styrene) resin has a good balance of properties such as impact resistance, chemical resistance, heat resistance, and mechanical strength as well as processability, and is easily molded such that it has been widely used for various products such as parts of automobiles, housings of electrical/electronic appliances, and the like, in addition to small household and personal items/amenities.

Recently, demand has increased for a thermoplastic resin having both low gloss and soft touch surface, which is different from the typical characteristics of conventional solid and glossy plastics. Particularly, demand is increasing for a thermoplastic resin having both low gloss and soft touch surface for the production of products that people often touch or see over a long period of time, such as interior parts of automobiles and housings of electrical/electronic appliances. Furthermore, because of strict regulations protecting the environment, there is also an increasing need for a low gloss resin which is prepared without a coating process and which is directly moldable.

There are three methods for preparing a low gloss ABS resin. One widely used method includes adding a non-gloss additive-matting agent, such as an inorganic filler, an acrylic resin or a cross-linked styrene resin, to the ABS resin. Another method removes gloss during a post processing procedure. This method can provide a low gloss effect by etching a molded product during an injection molding process or by a coating process. Another method forms a microscale rough surface by controlling the size of rubber particles of a dispersed phase in an ABS resin. Such a microscale rough surface may have low gloss by scattering incident light.

Although the method of obtaining a low gloss effect using the additive-matting agent can be convenient, there is a drawback in that homogeneous gloss may not be obtained depending on the distribution of the additive. The method of etching a molded product during an injection molding process or a coating process can increase production costs and is not environmentally friendly. Although the method of forming a rough surface by controlling rubber particle size has an advantage in that the method does not need an additional process step, it also has a drawback in that both low gloss property and soft touch surface cannot be obtained at the same time.

In order to lower resin gloss, U.S. Pat. No. 5,475,053 employs a spherical graft copolymer as a matting agent, and U.S. Pat. No. 4,652,614 employs a spherical graft copolymer containing rubber in an amount of about 5 to about 80% as a matting modifier. Additionally, U.S. Pat. No. 4,668,737 uses spherical rubber particles having a core/shell structure of about 0.05 to about 20 μm to reduce gloss, and U.S. Pat. No. 5,237,004 uses a polymer particle of about 2 to about 15 μm.

However, when using additives containing rubber particles, there may be problems of peeling, deterioration of physical properties, and partial high gloss, in addition to high production cost. Further, since the resins have a dense structure, as compared to rubber particles prepared by bulk polymerization or solution polymerization, it is difficult to obtain a soft touch surface using the same.

U.S. Pat. No. 5,605,963 and EP 0668319 disclose an ABS resin having large rubber particles in order to obtain low gloss and impact resistance at the same time. However, even though the ABS resins may have low gloss, the resins do not have a modified surface with soft touch.

Japanese Patent No. 3,673,084 and Japanese Patent Laid-open Publication No. 2000-141322 disclose the use of wood flour to modify surface texture. It can be difficult, however, to mold the resin at conventional molding temperatures.

SUMMARY OF THE INVENTION

The present invention is directed to a thermoplastic resin composition that can have a soft touch surface as well as excellent low gloss and impact strength, and to articles produced using the same. In the invention, a soft rubbery aromatic vinyl copolymer resin which comprises rubber particles with a graft ratio of about 40 to about 90% and an average particle diameter of about 6 to about 20 μm is introduced as a dispersed phase.

The thermoplastic resin composition of the present invention comprises (A) about 10 to about 80% by weight of a soft rubbery aromatic vinyl copolymer resin which comprises rubber particles with a graft ratio of about 40 to about 90% and an average particle diameter of about 6 to about 20 μm as a dispersed phase; (B) about 4 to about 60% by weight of a rubber-modified aromatic vinyl copolymer resin; and (C) about 5 to about 80% by weight of an aromatic vinyl-vinyl cyanide copolymer resin.

In exemplary embodiments of the present invention, the soft rubbery aromatic vinyl copolymer (A) may have a swelling index of about 13 to about 30.

The soft rubbery aromatic vinyl copolymer (A) may comprise a matrix comprising an aromatic vinyl-vinyl cyanide copolymer; and rubber particles which are dispersed in the matrix and have a graft ratio of about 40 to about 90% and an average particle diameter of about 6 to about 20 μm.

The rubber particles may have a form in which aromatic vinyl monomers, vinyl cyanide monomers, aromatic vinyl-vinyl cyanide copolymer or mixtures thereof are occluded therein.

In an exemplary embodiment, the soft rubbery aromatic vinyl copolymer resin (A) may comprise about 45 to about 90% by weight of an aromatic vinyl monomer, about 5 to about 35% by weight of a vinyl cyanide monomer, and about 5 to about 20% by weight of a conjugated diene rubber, and may be prepared by continuous bulk polymerization or continuous solution polymerization.

In exemplary embodiments, the rubber-modified aromatic vinyl copolymer resin (B) may be a graft copolymer including about 40 to about 80% by weight of a conjugated diene rubber, about 8 to about 45% by weight of an aromatic vinyl monomer, and about 2 to about 30% by weight of a vinyl cyanide monomer, and may contain rubber particles having an average particle diameter of about 0.1 to about 0.8 μm.

In exemplary embodiments, the aromatic vinyl-vinyl cyanide copolymer (C) may comprise about 40 to about 90% by weight of an aromatic vinyl monomer and about 10 to 60% by weight of a vinyl cyanide monomer.

In exemplary embodiments, the present invention may provide a molded article molded from the thermoplastic resin composition. The molded article may have an average surface roughness (Ra) of about 400 to about 800 nm and ten point height (Rz) of about 2,000 to about 7,000 nm. Furthermore, the molded article may have a gloss of about 40 or less measured using a 60 degree gloss meter. The molded article may be injection molded at a temperature of about 180 to about 280° C. with a barrel temperature of about 40 to about 80° C.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Soft Rubbery Aromatic Vinyl Copolymer Resin

When an ABS resin which contains rubbery particles is molded into an article, some rubbery particles are dispersed onto the surface of the molded article to form tiny protrusions on the surface of the article. These protrusions may scatter incident light, thereby reducing gloss.

However, since the rubber phase particles contained in conventional ABS resin are small-sized and have a rigid shell formed by grafting a large amount of monomers onto the rubber component which is closely packed, the graft ratio is high, and the rubber phase particle has a dense structure. Furthermore, such a structure makes it difficult for other solvents to penetrate the resin so that the conventional ABS resin has a low swelling index. The conventional ABS resin may still maintain the hard form of the rubber phase particles even after going through the molding process and protrusions may be formed in limited places where the rubber particles are dispersed so that the degree of surface roughness is low. Therefore, it is difficult to prepare products having sufficient low gloss and soft touch surface from a conventional ABS resin.

The soft rubbery aromatic vinyl copolymer resin (A) suitable for use in the present invention may comprise, as a dispersed phase, soft rubber particles having a larger particle diameter than the conventional ABS resin.

In particular, since the rubber phase particles of the soft rubbery aromatic vinyl copolymer resin (A) may have a larger rubber particle diameter than the conventional rubber particle and a low graft ratio and may be present in the form of particles in which other monomers or polymers are occluded therein, the rubber phase particles are structurally very flexible. The soft rubbery aromatic vinyl copolymer resin (A) also has a relatively high swelling index because it is easy for other solvents to penetrate into the resin.

Figure 4:
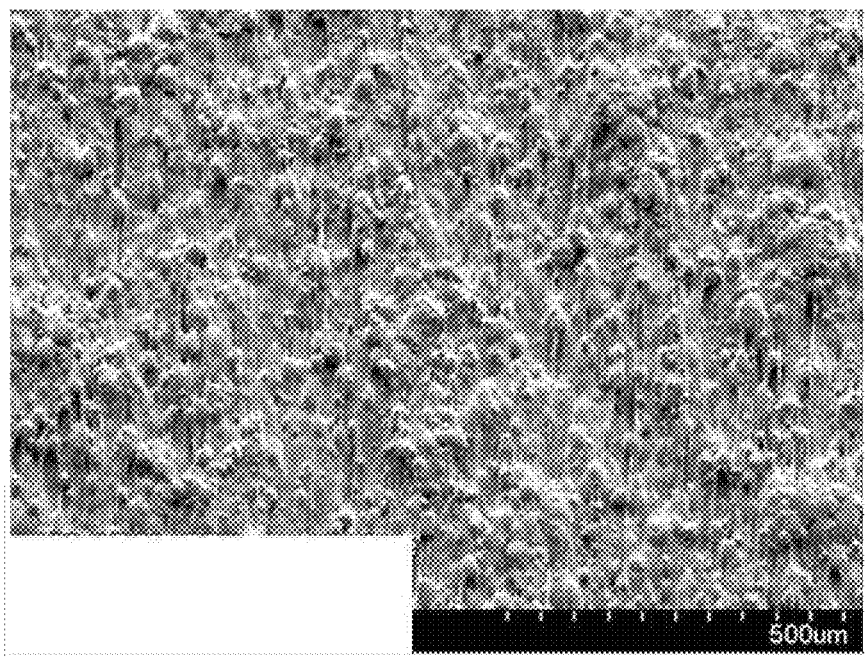
FIG. 4 is a TEM image of a molded article prepared in Example 1.

Moreover, when the molded article is produced from the composition of the present invention comprising the soft rubbery aromatic vinyl copolymer resin (A), as shown in FIG. 4, the morphology of soft rubber particles may be modified during the molding process such that a plurality of tiny protrusions as well as a plurality of grooves may be formed in the overall surface (that is, on at least about 90%, at least about 95%, at least about 98%, or more, of the surface) of the molded article. The micro-scale surface roughness increases due to the formation of the tiny protrusions and grooves and thus good low gloss and soft touch surface can be obtained.

The soft rubbery aromatic vinyl copolymer resin (A) used in the present invention comprises an aromatic vinyl monomer, a vinyl cyanide monomer and a conjugated diene rubber. In an exemplary embodiment, the soft rubbery aromatic vinyl copolymer resin (A) may comprise about 45 to about 90% by weight of an aromatic vinyl monomer, about 5 to about 35% by weight of a vinyl cyanide monomer and about 5 to about 20% by weight of a conjugated diene rubber, based on the total weight of the soft rubbery aromatic vinyl copolymer resin (A).

In some embodiments, the soft rubbery aromatic vinyl copolymer resin (A) may include the aromatic vinyl monomer in an amount of about 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the aromatic vinyl monomer can be in a range from about any of the foregoing amounts to about any other of the foregoing amounts.

In some embodiments, the soft rubbery aromatic vinyl copolymer resin (A) may include the vinyl cyanide monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35% by weight. Further, according to some embodiments of the present invention, the amount of the vinyl cyanide monomer can be in a range from about any of the foregoing amounts to about any other of the foregoing amounts.

In some embodiments, the soft rubbery aromatic vinyl copolymer resin (A) may include the conjugated diene rubber in an amount of about 5, 6, 7, 8, 9, 10, 11, 12, 13, 14, 15, 16, 17, 18, 19, or 20% by weight. Further, according to some embodiments of the present invention, the amount of the conjugated diene rubber can be in a range from about any of the foregoing amounts to about any other of the foregoing amounts.

More specifically, the soft rubbery aromatic vinyl copolymer resin (A) comprises a matrix comprising an aromatic vinyl-vinyl cyanide copolymer and rubber particles dispersed in the matrix.

The rubber particles dispersed in the soft rubbery aromatic vinyl copolymer resin (A) may have a form in which an aromatic vinyl monomer, a vinyl cyanide monomer, an aromatic vinyl-vinyl cyanide copolymer or a mixture thereof are occluded therein.

The rubber particles may have an average particle diameter of about 6 to about 20 μm, for example about 6.5 to about 15 μm, and as another example about 7 to about 15 μm. In some embodiments, the rubber particles may have an average particle diameter of about 6, 7, 8, 9, 10, 11, 12, 13, 14, 15, 16, 17, 18, 19, or 20 μm. Further, according to some embodiments of the present invention, the rubber particles may have an average particle diameter in a range from about any of the foregoing amounts to about any other of the foregoing amounts. If the particle diameter is less than about 6 μm, it may be difficult to obtain sufficient low gloss property, and if the particle diameter is more than about 20 μm, it may be difficult to obtain good impact strength. The average particle diameter of the rubber particles may be measured using a laser light scattering instrument based on the volume average particle diameter. Further, the average particle diameter may be measured using a scale bar of a transmission electron microscope image or a molecular weight average particle diameter.

In the present invention, the graft ratio of the rubber particles which are dispersed in the soft rubbery aromatic vinyl copolymer resin (A) may be measured by the following method. A predetermined amount of the soft rubbery aromatic vinyl copolymer resin (A) is put into acetone and stirred sufficiently to dissolve and then left at room temperature for 2 days, and after that, gel and solution are separated by centrifugation. At this time, the rubber phase particle is separated in gel. Then, the gel is dried in a vacuum oven having the temperature of about 50° C. for a day and the graft ratio is calculated by the following equation 1.

$$\text{Graft ratio (\%)} = \frac{\text{dried gel (wt \%)} - \text{rubber (wt \%)}}{\text{rubber (wt \%)}} \times 100 \quad \text{[Equation 1]}$$

In the above equation 1, the dried gel (wt %) refers to % by weight of the dried gel based on the soft rubbery aromatic vinyl copolymer resin, and rubber (wt %) refers to % by weight of the conjugated diene rubber added to prepare the soft rubbery aromatic vinyl copolymer resin.

The rubber particles may have a graft ratio of about 40 to about 90%, for example about 60 to about 90%, and as another example about 70 to about 90%. In some embodiments, the rubber particles may have a graft ratio of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90%. Further, according to some embodiments of the present invention, the rubber particles may have a graft ratio from about any of the foregoing amounts to about any other of the foregoing amounts. If the graft ratio is less than about 40%, the rubber particles may not be stable so that it can be difficult to obtain sufficient impact strength, and if the graft ratio is more than about 90%, it is difficult to obtain a desirable soft touch surface.

The swelling index of the soft rubbery aromatic vinyl copolymer resin (A) may be measured by the following method. 1 g of the soft rubbery aromatic vinyl copolymer resin (A) is added into 35 mL of solvent in which toluene and methyl ethyl ketone are mixed at a 5:5 volume ratio to prepare a mixed solution. The mixed solution is shaken weakly to dissolve the soft rubbery aromatic vinyl copolymer resin (A), and then placed at room temperature for 21 hours to swell.

After the swollen gel is centrifuged at about 25,000 rpm, the weight of wet gel is measured. Then, the wet gel is dehydrated by vacuum drying for 4 hours at 105° C., and the weight of dried gel is measured. The swelling index of the soft rubbery aromatic vinyl copolymer resin (A) may be calculated using the following equation 2.

$$\text{Swelling index} = \frac{\text{weight of wet gel}}{\text{weight of dried gel}} \quad \text{[Equation 2]}$$

The soft rubbery aromatic vinyl copolymer resin (A) may have a swelling index of about 13 to about 30, for example about 15 to about 25. In some embodiments, the soft rubbery aromatic vinyl copolymer resin (A) may have a swelling index of about 13, 14, 15, 16, 17, 18, 19, 20, 21, 22, 23, 24, 25, 26, 27, 28, 29, or 30. Further, according to some embodiments of the present invention, the soft rubbery aromatic vinyl copolymer resin (A) may have a swelling index from about any of the foregoing amounts to about any other of the foregoing amounts. When the swelling index ranges from about 13 to about 30, soft touch surface, good low gloss and high impact strength may be obtained. In contrast, a conventional ABS resin has a swelling index of about 5 to about 12 percent.

Examples of the aromatic vinyl monomer used for the soft rubbery aromatic vinyl copolymer resin (A) may include, but are not limited to, styrene, α-methyl styrene, 2-methyl styrene, 3-methyl styrene, 4-methyl styrene, 2-ethyl styrene, 3-ethyl styrene, 4-ethyl styrene, 4-n-propyl styrene, 4-t-butyl styrene, 1-vinyl naphthalene, 2-vinyl naphthalene, vinyl toluene and the like. These aromatic vinyl monomers can be used alone or in combination with one another. In exemplary embodiments, the aromatic vinyl monomer is styrene.

The vinyl cyanide monomer used for the soft rubbery aromatic vinyl copolymer resin (A) may have a copolymerizable unsaturated hydrocarbon group and a cyanide group together. In an exemplary embodiment, hydrogen of the unsaturated hydrocarbon may be partially substituted with a $C_1$ to $C_8$ alkyl group.

Examples of the vinyl cyanide monomer may include, but are not limited to, acrylonitrile, methacrylonitrile, ethacrylonitrile, and the like. These monomers can be used alone or in combination with one another. In exemplary embodiments, the vinyl cyanide monomer is acrylonitrile.

Examples of the conjugated diene rubber used for the soft rubbery aromatic vinyl copolymer resin (A) may include, but are not limited to, diene rubbers such as polybutadiene, poly (styrene-butadiene), poly(acrylonitrile-butadiene), and the like; saturated rubbers in which hydrogen is added to the diene rubbers; isoprene rubbers; chloroprene rubbers; polybutylacrylate; and ethylene-propylene-diene terpolymer (EPDM), and the like. These rubbers can be used alone or in combination with one another.

The conjugated diene rubber may be butadiene rubber or styrene-butadiene rubber, and in another example butadiene rubber. In an exemplary embodiment, the butadiene rubber may have a solution viscosity of about 30 to about 200 cps in 5% styrene solution, for example about 100 to about 200 cps, and as another example about 150 to about 200 cps.

The soft rubbery aromatic vinyl copolymer resin (A) may be prepared by well-known polymerization methods. In exemplary embodiments, the soft rubbery aromatic vinyl copolymer resin (A) can be prepared using continuous bulk polymerization or continuous solution polymerization.

It is not easy to stably prepare rubber phase particles having an average particle diameter of about 6 to about 20 μm using a conventional polymerization process such as emulsion polymerization or suspension polymerization. Furthermore, it is difficult to prepare the rubber phase particles having a large occlusion and a graft ratio of about 40 to about 90% with such a conventional method and even more difficult to adjust the swelling index to be in the range of about 13 to about 30.

In an exemplary embodiment, the soft rubbery aromatic vinyl copolymer resin (A) may be prepared by the following method.

The method of the present invention comprises mixing about 100 parts by weight of a mixed solution comprising about 40 to about 60 parts by weight of an aromatic vinyl monomer, about 10 to about 25 parts by weight of a vinyl cyanide monomer, about 7 to about 20 parts by weight of a conjugated diene rubber, and about 5 to about 30 parts by weight of a solvent with about 0.005 to about 0.03 parts by weight of a polymerization initiator to prepare a mixture; and adding the mixture slowly to a reactor followed by continuous polymerization under mild conditions to obtain a soft rubber phase particle. In an exemplary embodiment, about 0.005 to about 0.5 parts by weight of a molecular weight control agent may be added to 100 parts by weight of the mixed solution.

In some embodiments, the polymerization initiator may be used in an amount of about 0.005, 0.006, 0.007, 0.008, 0.009, 0.01, 0.02, or 0.03, parts by weight. Further, according to some embodiments of the present invention, the amount of the polymerization initiator can be in a range from about any of the foregoing amounts to about any other of the foregoing amounts.

In a conventional method of preparing rubber particles, since the phase inversion occurs rapidly using at least about 0.04 parts by weight of a polymerization initiator, a large amount of monomers are rapidly grafted onto a rubber particle to form a rigid shell, such that it is difficult for other monomers or polymers to penetrate into the inner part of the rubber particle. Accordingly, the rubber phase particles prepared by the above conventional method may have small sizes and dense structures so that it is hard for the rubber phase particles to form occlusions.

In contrast, in the method of the present invention, about 0.005 to about 0.03 parts by weight of a polymerization initiator may be used so that the mixture can be slowly phase-inverted and polymerized under mild conditions where stirring speed and conversion rate can be controlled step by step. Accordingly, the amount of grafted monomers may decrease, the occlusion rate of other monomers or polymers into the rubber particles may increase, and thus the size of the particle may be enlarged. In such cases, since the rubber particles are very flexible, the resin can be easily modified during the molding process and the micro-scale surface roughness can be increased.

In an exemplary embodiment of the present invention, the mixture may be fed into a first reactor with a speed of about 10 to 50 kg/hr, stirred at a speed of about 70 to about 120 rpm, and polymerized to a conversion rate of about 30 to about 40%. The polymerization product may be fed into a second reactor, stirred at a speed of about 40 to about 80 rpm, and further polymerized to a conversion rate of about 55 to about 80%. The method may further comprise, if needed, the step of discharging unreacted monomer from the reactor after further polymerization.

The soft rubbery aromatic vinyl copolymer resin (A) of the present invention may be used in an amount of about 10 to about 80% by weight, for example about 20 to about 70% by weight, and as another example about 35 to about 65% by weight, based on the total weight of the resin composition. In some embodiments, the soft rubbery aromatic vinyl copolymer resin (A) may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the soft rubbery aromatic vinyl copolymer resin (A) can be in a range from about any of the foregoing amounts to about any other of the foregoing amounts.

If the amount of the soft rubbery aromatic vinyl copolymer resin (A) is less than about 10% by weight, it may be difficult to obtain a certain level of low gloss and good soft touch surface, and if the amount is more than 80% by weight, sufficient impact resistance may not be obtained.

(B) Rubber Modified Aromatic Vinyl Copolymer Resin

The rubber modified aromatic vinyl copolymer resin (B) of the present invention may comprise about 40 to about 80% by weight of a conjugated diene rubber, based on the total weight of the rubber modified aromatic vinyl copolymer resin (B). In some embodiments, the rubber modified aromatic vinyl copolymer resin (B) may include the conjugated diene rubber in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the conjugated diene rubber can be in a range from about any of the foregoing amounts to about any other of the foregoing amounts. Within these ranges, desired impact resistance can be obtained.

In addition, in order to improve impact resistance of the molded article molded from the thermoplastic resin composition of the present invention, the rubber modified aromatic vinyl copolymer resin (B) may have an average rubber particle diameter of about 0.1 to about 0.8 μm. The average particle diameter of the rubber particles may be measured using a laser light scattering instrument based on the volume average particle diameter. Furthermore, the average particle diameter may be measured using a scale bar of a transmission electron microscope image or a molecular weight average particle diameter.

The rubber modified aromatic vinyl copolymer resin (B) may be prepared by a well-known polymerization method such as emulsion polymerization, suspension polymerization, bulk polymerization and the like. In an exemplary embodiment, the rubber modified aromatic vinyl copolymer resin (B) may be prepared by graft copolymerizing about 8 to about 45% by weight of an aromatic vinyl monomer, about 2 to about 30% by weight of a vinyl cyanide monomer, and about 40 to about 80% by weight of a conjugated diene rubber.

In some embodiments, the rubber modified aromatic vinyl copolymer resin (B) may be prepared using aromatic vinyl monomer in an amount of about 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45% by weight. Further, according to some embodiments of the present invention, the amount of the aromatic vinyl monomer can be in a range from about any of the foregoing amounts to about any other of the foregoing amounts.

In some embodiments, the rubber modified aromatic vinyl copolymer resin (B) may be prepared using vinyl cyanide monomer in an amount of about 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the amount of the vinyl cyanide monomer can be in a range from about any of the foregoing amounts to about any other of the foregoing amounts.

In order to impart processability and heat resistance, monomers such as acrylic acid, methacrylic acid, maleic anhydride, and N-substituted maleimide may be added during the preparation of the rubber modified aromatic vinyl copolymer resin (B). The monomers may be used in an amount of about 0 to about 15% by weight, based on the total weight of the rubber modified aromatic vinyl copolymer resin (B). In exemplary embodiments, the monomer(s) imparting processability and heat resistance may be present, i.e., in an amount greater than about 0% by weight. In some embodiments, the monomer(s) imparting processability and heat resistance may be used in an amount of about 0, 1, 2, 3, 4, 5, 6, 7, 8, 9, 10, 11, 12, 13, 14, or 15% by weight. Further, according to some embodiments of the present invention, the amount of the monomer(s) imparting processability and heat resistance can be in a range from about any of the foregoing amounts to about any other of the foregoing amounts. In other embodiments of the invention, the monomer(s) imparting processability and heat resistance may not be present (i.e., 0% by weight).

Examples of the conjugated diene rubber used for the rubber modified aromatic vinyl copolymer resin (B) may include, but are not limited to, diene rubbers such as polybutadiene, poly(styrene-butadiene), poly(acrylonitrile-butadiene), and the like; saturated rubbers in which hydrogen is added to the diene rubbers; isoprene rubbers; chloroprene rubbers; polybutylacrylate; and ethylene-propylene-diene terpolymer (EPDM), and the like. These rubbers can be used alone or in combination with one another. In exemplary embodiments, the rubber is a diene rubber, for example butadiene rubber.

Examples of the aromatic vinyl monomer used for the rubber modified aromatic vinyl copolymer resin (B) may include, but are not limited to, styrene, α-methyl styrene, 2-methyl styrene, 3-methyl styrene, 4-methyl styrene, 2-ethyl styrene, 3-ethyl styrene, 4-ethyl styrene, 4-n-propyl styrene, 4-t-butyl styrene, 1-vinyl naphthalene, 2-vinyl naphthalene, vinyl toluene and the like. These monomers can be used alone or in combination with one another. In exemplary embodiments, the aromatic vinyl monomer is styrene.

Examples of the vinyl cyanide monomer suitable for use in the rubber-modified aromatic vinyl copolymer resin (B) may include, but are not limited to, acrylonitrile, methacrylonitrile, ethacrylonitrile, and the like. These monomers can be used alone or in combination with one another.

The thermoplastic resin composition may comprise about 4 to about 60% by weight of the rubber modified aromatic vinyl copolymer resin (B), for example about 8 to about 40% by weight, based on the total weight of the resin composition. In some embodiments, the thermoplastic resin composition may include the rubber modified aromatic vinyl copolymer resin (B) in an amount of about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the amount of the rubber modified aromatic vinyl copolymer resin (B) can be in a range from about any of the foregoing amounts to about any other of the foregoing amounts. If the amount of the rubber modified aromatic vinyl copolymer resin (B) is less than about 4% by weight, it may be difficult to obtain a certain level of impact resistance, and if the amount is more than 60% by weight, flowability and processability can be deteriorated. A range of the graft ratio of the resin (B) is about 90% to about 120%.

(C) Aromatic Vinyl-Vinyl Cyanide Copolymer Resin

The aromatic vinyl-vinyl cyanide copolymer resin (C) may be prepared by copolymerizing about 40 to about 90% by weight of an aromatic vinyl monomer and about 10 to about 60% by weight of a vinyl cyanide monomer, based on the total weight of the aromatic vinyl-vinyl cyanide copolymer resin (C).

In some embodiments, the aromatic vinyl-vinyl cyanide copolymer resin (C) may be prepared using the aromatic vinyl monomer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the aromatic vinyl monomer can be in a range from about any of the foregoing amounts to about any other of the foregoing amounts.

In some embodiments, the aromatic vinyl-vinyl cyanide copolymer resin (C) may be prepared using the vinyl cyanide monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 45, 46, 47, 48, 49, 50, 51, 52, 53, 54, 55, 56, 57, 58, 59, or 60% by weight. Further, according to some embodiments of the present invention, the amount of the vinyl cyanide monomer can be in a range from about any of the foregoing amounts to about any other of the foregoing amounts.

The aromatic vinyl-vinyl cyanide copolymer resin (C) may further comprise acrylic acid, methacrylic acid, maleic anhydride, or N-substituted maleimide to impart processability and heat resistance and the monomers may be used in an amount of about 0 to about 30% by weight, based on the total weight of the aromatic vinyl-vinyl cyanide copolymer resin (C). In exemplary embodiments, the monomer(s) imparting processability and heat resistance may be present, i.e., in an amount greater than about 0% by weight. In some embodiments, the monomer(s) imparting processability and heat resistance may be used in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the amount of the monomer(s) imparting processability and heat resistance can be in a range from about any of the foregoing amounts to about any other of the foregoing amounts. In other embodiments of the invention, the monomer(s) imparting processability and heat resistance may not be present (i.e., 0% by weight).

Examples of the aromatic vinyl monomer used for the aromatic vinyl-vinyl cyanide copolymer resin (C) may include, but are not limited to, styrene, α-methyl styrene, 2-methyl styrene, 3-methyl styrene, 4-methyl styrene, 2-ethyl styrene, 3-ethyl styrene, 4-ethyl styrene, 4-n-propyl styrene, 4-t-butyl styrene, 1-vinyl naphthalene, 2-vinyl naphthalene, vinyl toluene and the like. These aromatic vinyl monomers can be used alone or in combination with one another. In an exemplary embodiment, the aromatic vinyl monomer is styrene.

The aromatic vinyl-vinyl cyanide copolymer resin (C) may comprise about 40 to about 90% by weight of an aromatic vinyl monomer, for example about 50 to about 85% by weight. In some embodiments, the aromatic vinyl-vinyl cyanide copolymer resin (C) may include the aromatic vinyl monomer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the aromatic vinyl monomer can be in a range from about any of the foregoing amounts to about any other of the foregoing amounts.

If the amount of the aromatic vinyl monomer is less than 40% by weight, the viscosity of the rubber may significantly increase and thus the processability of the low gloss thermoplastic resin composition may be deteriorated. If the amount is more than 90% by weight, the rigidity may be deteriorated.

Examples of the vinyl cyanide monomer may include, but are not limited to, acrylonitrile, methacrylonitrile, ethacrylonitrile, and the like. These monomers can be used alone or in combination with one another. In exemplary embodiments, the vinyl cyanide monomer is acrylonitrile. The vinyl cyanide monomer may be used in an amount of about 10 to about 60% by weight.

In an exemplary embodiment, the thermoplastic resin composition may comprise about 5 to about 80% by weight, for example about 10 to about 50% by weight, of the aromatic vinyl-vinyl cyanide copolymer resin (C), based on the total weight of the thermoplastic resin. In some embodiments, the thermoplastic resin composition may include the aromatic vinyl-vinyl cyanide copolymer resin (C) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the aromatic vinyl copolymer resin (C) can be in a range from about any of the foregoing amounts to about any other of the foregoing amounts.

If the amount of the aromatic vinyl-vinyl cyanide copolymer resin (C) is less than about 5% by weight, the processability of the low gloss thermoplastic resin composition may be deteriorated, and if the amount is more than about 80% by weight, it can be difficult to obtain sufficient impact strength.

The thermoplastic resin composition may further comprise one or more additives, such as but not limited to flame retardants, thermal stabilizers, impact modifiers, antioxidants, light stabilizers, pigments, dyes, inorganic fillers, and the like. These additives may be used alone or in combination with one another. The inorganic fillers may include without limitation asbestos, glass fiber, talc, sulfate, and the like. The additives may be used in an amount of about 30 parts by weight or less, based on about 100 parts by weight of (A)+(B)+(C), for example, about 0.001 to 30 parts by weight.

The thermoplastic resin composition may be prepared by conventional methods. For example, the resin composition may be prepared in pellet form by mixing the aforementioned components and select additives in a mixer at the same time and melt-extruding the mixture through a conventional extruder.

The molded article molded from the thermoplastic resin composition of the present invention may have excellent impact strength. Further, as shown in FIG. 4, a plurality of tiny protrusions can be densely formed on the surface of the molded article so that micro-scale surface roughness increases and soft touch surface and good low gloss can be obtained.

In an exemplary embodiment, the molded article molded from the thermoplastic resin composition may have average surface roughness (Ra) of about 400 to about 800 nm and ten point height (Rz) of about 2,000 to about 7,000 nm. The average surface roughness (Ra) and ten point height (Rz) may be measured using VEECO Optical Profiler NT-1100 and the measuring method will be described in detail below. Further, the molded article may have a gloss of about 40 or less measured by 60 degree gloss meter. As the measured gloss value is decreased, the gloss of the article may be lower. Therefore, there is no limitation on minimum value of gloss in the present invention. The 60 degree gloss may be measured using BYK-Gardner Gloss Meter.

Further, the molded article may have Izod impact strength of about 20 to about 30 kgf·cm/cm and about 17 to about 25 kgf·cm/cm, measured using ⅛" thick specimens and ¼" thick specimens, respectively, in accordance with ASTM D256.

As such, since the thermoplastic resin composition and the article molded therefrom may have good soft touch surface, low gloss and impact strength, the thermoplastic resin composition can be used in various products such as the inner/outer parts of electric/electronic goods or housings, automobile parts, small household items/amenities and the like.

In an exemplary embodiment, the thermoplastic resin composition may be molded into electric/electronic goods or housings for TVs, audio sets, mobile phones, digital cameras, GPS navigators, washing machines, computers, monitors, MP3 players, DVD players, video players, CD players, dishwashers, and office automation equipment. Further, the thermoplastic resin composition may be used for the inner/outer parts of automobiles.

The molding methods may be, but are not limited to, extrusion, injection, or casting molding, and may be easily carried out by those skilled in the art.

In an exemplary embodiment, the molded article may be produced from the thermoplastic resin composition using an injection molding machine at a temperature of about 180 to about 280° C. with a barrel temperature of about 40 to about 80° C.

The invention may be better understood by reference to the following examples which are intended for the purpose of illustration and are not to be construed as in any way limiting the scope of the present invention, which is defined in the claims appended hereto.

EXAMPLES

The specifications of components used in the Examples and Comparative Examples will be described more fully hereinafter.

Figure 1:
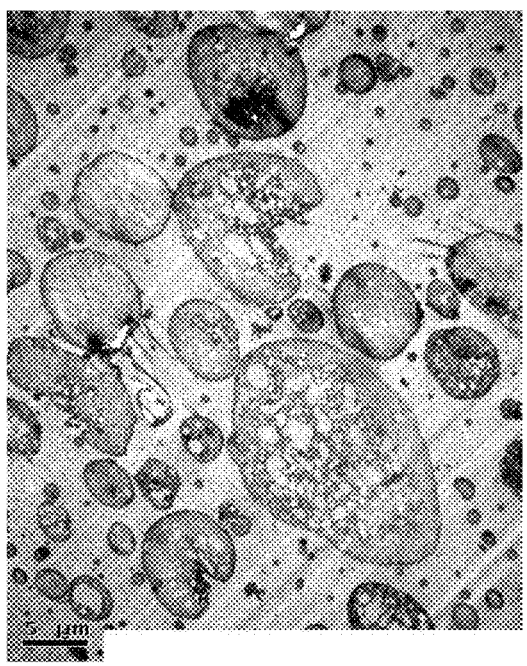
FIG. 1 is a transmission electron microscope (TEM) image of the soft rubbery aromatic vinyl copolymer resin (a1) used in Examples 1 to 4.

(A) Soft Rubbery Aromatic Vinyl Copolymer Resin (a1) To a mixture comprising 53.4 parts by weight of styrene, 17.8 parts by weight of acrylonitrile and 20 parts by weight of ethyl benzene is added 8.8 parts by weight of butadiene rubber having a solution viscosity of 170 cps in 5% styrene solution. Then 0.015 parts by weight of 1,1-bis(t-butylperoxy)cyclohexane as an initiator, and 0.07 parts by weight of t-dodecyl mercaptan as a molecular weight controlling agent are added thereto to prepare a mixed solution. The mixed solution is fed into a reactor at 25 kg/hr. The first reactor is controlled to have a stirring speed of 100 rpm and a conversion rate of 35%. The second reactor is controlled to have a stirring speed of 70 rpm and a conversion rate of 75%. The reactant discharged from the reactors is continuously transferred to a devolatilizing apparatus to remove unreacted monomer and solvent. The polymerization product is then pelletized to obtain an ABS resin (a1). The ABS resin (a1) obtained therefrom has a swelling index of 16.2, an average rubber particle diameter of 8.58 μm, and a graft ratio of 77.8%. The TEM image of the rubber particle of the ABS resin (a1) is shown in FIG. 1.

Figure 2:
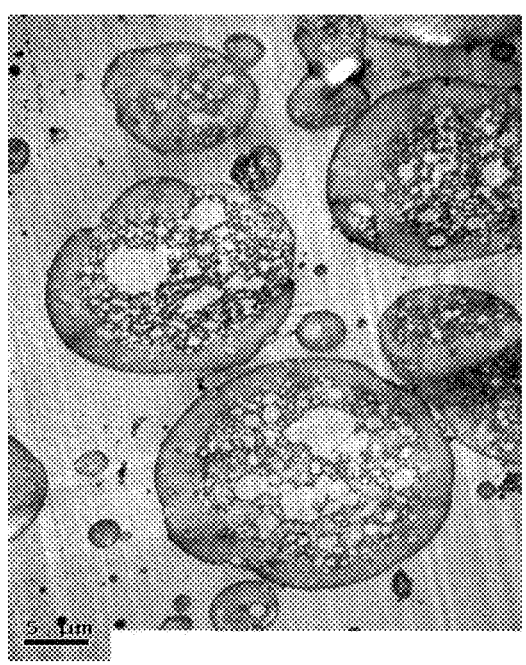
FIG. 2 is a TEM image of the soft rubbery aromatic vinyl copolymer resin (a2) used in Examples 5 and 6.

(a2) The same method of preparing ABS resin as the method of (a1) is conducted except that the stirring speed of the first reactor is 80 rpm. The ABS resin (a2) obtained therefrom has a swelling index of 19.3, an average rubber particle diameter of 14.11 μm, and a graft ratio of 82.3%. The TEM image of the rubber particle of the ABS resin (a2) is shown in FIG. 2.

Figure 3:
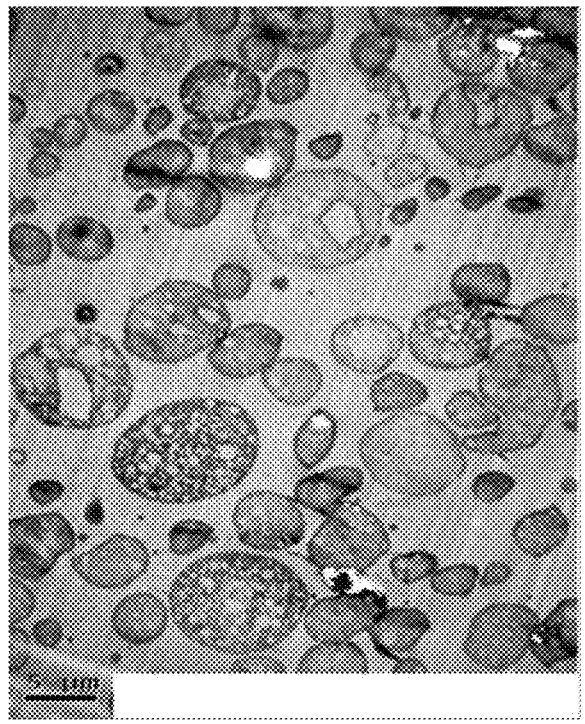
FIG. 3 is a TEM image of the soft rubbery aromatic vinyl copolymer resin (a3) used in Comparative Examples 1 and 2.

(a3) The same method of preparing ABS resin as the method of (a1) is conducted except that 0.04 parts by weight of 1,1-bis(t-butylperoxy)cyclohexane is used and the stirring speed of the first reactor is 130 rpm. The ABS resin (a3) obtained therefrom has a swelling index of 11.6, an average rubber particle diameter of 6.42 μm, and a graft ratio of 116.8%. The TEM image of the rubber particle of the ABS resin (a3) is shown in FIG. 3.

(B) Rubber Modified Aromatic Vinyl Copolymer Resin (b1) 31 parts by weight of styrene, 11 parts by weight of acrylonitrile and 58 parts by weight of butadiene rubber are mixed and emulsion-polymerized. The graft-ABS (hereinafter "g-ABS") in core-shell form containing rubber particles having an average particle diameter of 0.32 μm and 58% by weight of conjugated diene rubber is used.

(b2) The g-ABS prepared in the same method as in the Example (b1) except that the rubber particles have an average particle diameter of 0.21 μm.

(C) Aromatic Vinyl-Vinyl Cyanide Copolymer Resin

SAN resin having a weight average molecular weight of 120,000 and 32% by weight of acrylonitrile is used.

(D) Antioxidant

Octadecyl-3(4-hydroxy-3,5-di-tert-butylphenyl)propionate is used as a hindered phenolic antioxidant.

(E) Silicone-Based Impact Modifier

Dimethylpolysiloxane is used as a silicone-based impact modifier.

Examples 1-6

The components as shown in Table 1 are mixed, and the mixture is melt-kneaded and extruded though a conventional twin screw extruder (L/D=29., Φ=45 mm) at a temperature of 220° C. to prepare pellets of the thermoplastic resin. The resin pellets are dried at 80° C. for 3 hours, and molded into test specimens using a 6 oz injection molding machine at 180~80° C. with a barrel temperature of 40~80° C. The TEM image of the test specimen prepared in Example 1 is shown in FIG. 4.

Comparative Examples 1-4

Figure 5:
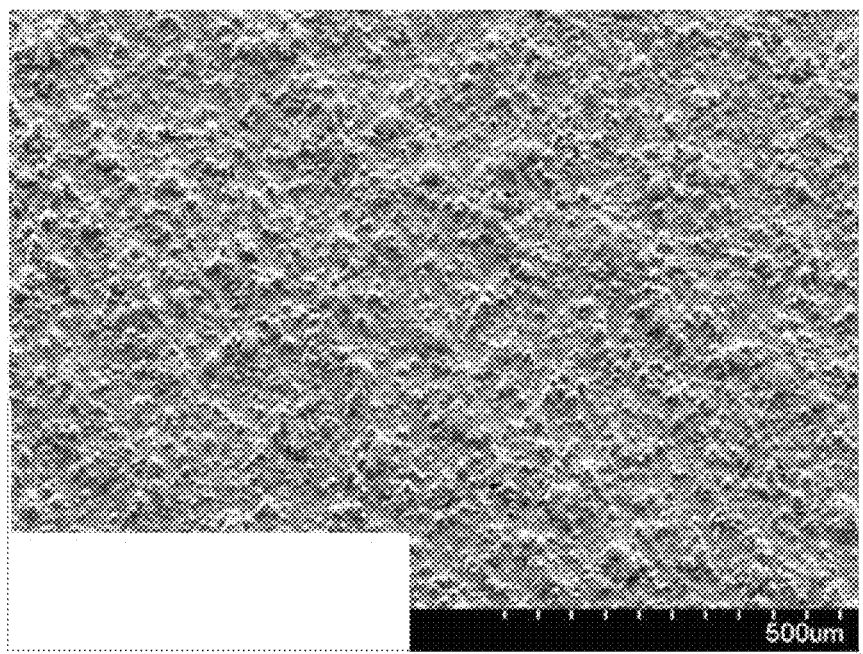
FIG. 5 is a TEM image of a molded article prepared in Comparative Example 1.

The components as shown in Table 1 are mixed, and the mixture is melt-kneaded and extruded though a conventional twin screw extruder (L/D=29., Φ=45 mm) at a temperature of 220° C. to prepare pellets of the thermoplastic resin. The resin pellets are dried at 80° C. for 3 hours, and molded into test specimens using a 6 oz injection molding machine at 180~80° C. with a barrel temperature of 40~80° C. The TEM image of the test specimen prepared in Comparative Example 1 is shown in FIG. 5.

TABLE 1

| | (A) | | | (B) | | | | |
|---|---|---|---|---|---|---|---|---|
| | (a1) | (a2) | (a3) | (b1) | (b2) | (C) | (D) | (E) |
| Example 1 | 50 | — | — | 15 | — | 35 | 0.1 | 0.02 |
| Example 2 | 50 | — | — | — | 15 | 35 | 0.1 | 0.02 |
| Example 3 | 60 | — | — | 15 | — | 25 | 0.1 | 0.02 |
| Example 4 | 60 | — | — | — | 15 | 25 | 0.1 | 0.02 |
| Example 5 | — | 50 | — | 15 | — | 35 | 0.1 | 0.02 |
| Example 6 | — | 60 | — | 15 | — | 25 | 0.1 | 0.02 |
| Comparative Example 1 | — | — | 50 | 15 | — | 35 | 0.1 | 0.02 |
| Comparative Example 2 | — | — | 60 | 15 | — | 25 | 0.1 | 0.02 |
| Comparative Example 3 | — | — | — | 20 | — | 80 | 0.1 | 0.02 |
| Comparative Example 4 | — | — | — | 25 | — | 75 | 0.1 | 0.02 |

The physical properties of the test specimens prepared in Examples 1-6 and Comparative Examples 1-4 are measured in accordance with the following methods, and the results are shown in Table 2.

(1) Izod Impact Strength: The notch Izod impact strength is measured for the specimens of ¼" and ⅛" (inch, kgf·cm/cm), after exposure at 23° C. and 50% of relative humidity for 48 hours in accordance with ASTM D-256.

(2) Gloss: The 60 degree gloss is measured using a BYK-Gardner Gloss Meter.

Figure 6:
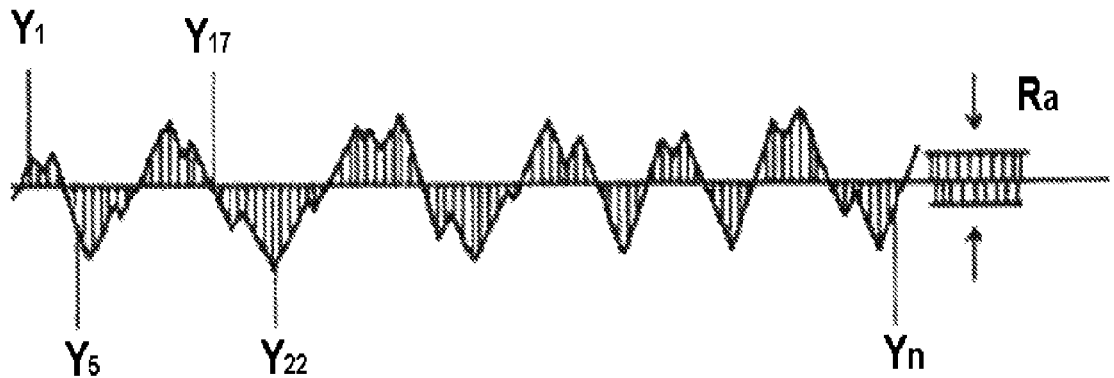
FIG. 6 is a diagram illustrating the calculation of average surface roughness (Ra).

(3) Surface Roughness: The surface roughness is measured using the surface roughness measuring apparatus, VEECO Optical Profiler NT-1100. The meaning of the terms used in the present invention is defined as follows:

(3-1) Average surface roughness (Ra): The average surface roughness (Ra) can be obtained from the arithmetic average of the absolute values of the deviation of the surface profile height from the mean line within the sampling length, as illustrated by the diagram of FIG. 6. As Ra increases, surface roughness increases. The unit of the average surface roughness is nanometers (nm).

Figure 7:
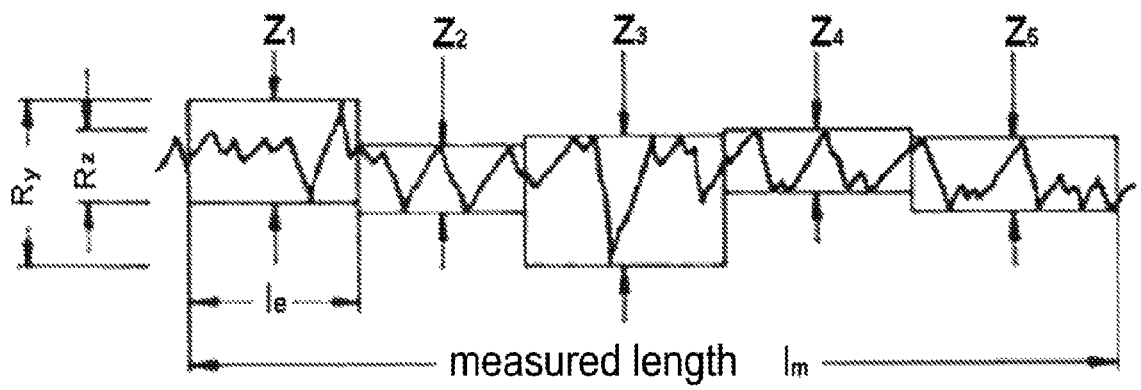
FIG. 7 is a diagram illustrating the calculation of ten point average height (Rz).

(3-2) Ten point average height (Rz): The ten point average height (Rz) can be measured from the average height difference between the five highest peaks and the five lowest valleys measured over one sampling length from a line parallel to the mean line of the roughness curve, as illustrated by the diagram of FIG. 7. The unit is nanometers (nm).

Ten point average height (Rz) is used for measuring sliding faces. As the value of the ten point height (Rz) increases, surface roughness increases.

TABLE 2

| | Izod Impact Strength | | Surface Roughness | | Gloss | | |
|---|---|---|---|---|---|---|---|
| | ⅛" | ¼" | Ra | Rz | 20° | 60° | 85° |
| Example 1 | 21 | 17.5 | 598.6 | 4,280 | 6.2 | 23.9 | 71.3 |
| Example 2 | 20.1 | 17.1 | 602.6 | 4,380 | 5.6 | 21.6 | 73.5 |
| Example 3 | 23.3 | 16.8 | 633.0 | 5,140 | 8.3 | 24.5 | 70.7 |
| Example 4 | 21.4 | 18.2 | 568.5 | 4,210 | 7.4 | 28.4 | 75.4 |
| Example 5 | 22.2 | 17.9 | 590.1 | 4,040 | 5.0 | 19.0 | 69.4 |
| Example 6 | 24.1 | 20.1 | 584.5 | 4,410 | 6.4 | 18.2 | 68.3 |
| Comparative Example 1 | 18.9 | 15.3 | 313.1 | 1,170 | 18.4 | 53.6 | 90.4 |
| Comparative Example 2 | 20.1 | 16.8 | 318.7 | 1,220 | 20.8 | 59.2 | 92.3 |
| Comparative | 14.6 | 11.1 | 90.3 | 1,630 | 81.0 | 94.4 | 96.8 |

TABLE 2-continued

| | Izod Impact Strength | | Surface Roughness | | Gloss | | |
|---|---|---|---|---|---|---|---|
| | 1/8" | 1/4" | Ra | Rz | 20° | 60° | 85° |
| Example 3 Comparative Example 4 | 16.1 | 12.3 | 84.7 | 1,510 | 82.1 | 95.4 | 97.0 |

As shown in Table 2, Examples 1-6 using the soft rubbery aromatic vinyl copolymer resins (a1 and a2) with a swelling index of about 13 to about 30 and a graft ratio of about 40 to about 90% exhibit excellent surface roughness and low gloss as well as improved impact strength.

Further, although the average particle diameter of the rubber particles of the rubber modified aromatic vinyl copolymer resin (B) changes, it is seen that good surface roughness can be obtained.

As such, as micro-scale surface roughness increases, it is seen that the surface of the test specimens prepared according to the present invention exhibits low gloss and soft touch feeling, as if it were paper or pulp.

On the other hand, the soft rubbery aromatic vinyl copolymer resin (a3) in Comparative Examples 1 and 2 exhibits low gloss, but relatively low swelling index as well as high graft ratio, and thus it is seen that surface roughness is not sufficiently improved.

As shown in FIG. 4, the test specimen in Example 1 exhibits significantly increased micro-scale surface roughness in that the overall surface of the test specimen has tiny protrusions and dense grooves. However, as shown in FIG. 5, the test specimen in Comparative Example 1 demonstrates that protruding spots are recognized only in the area where the rubber particles are dispersed and that the increasing rate of the surface roughness is low.

Comparative Examples 3 and 4 represent conventional ABS resin composition prepared by melt-extrusion. As shown in Table 2, the resin composition of the present invention exhibits excellent low gloss, impact strength and good surface roughness, as compared to the conventional ABS resin composition.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A low gloss thermoplastic resin composition with a soft touch surface comprising:
   (A) about 10 to about 80% by weight of a soft rubbery aromatic vinyl copolymer resin which comprises rubber particles with a graft ratio of about 60 to about 90% and an average particle diameter of about 6 to about 20 μm as a dispersed phase, wherein said soft rubbery aromatic vinyl copolymer (A) has a swelling index of about 13 to about 30;
   (B) about 4 to about 60% by weight of a rubber-modified aromatic vinyl copolymer resin; and
   (C) about 5 to about 80% by weight of an aromatic vinyl-vinyl cyanide copolymer resin, wherein a molded article formed of the composition has an average surface roughness (Ra) of about 400 to about 800 nm and a ten point height (Rz) of about 2,000 to about 7,000 nm and a gloss of about 40 or less measured using a 60 degree gloss meter.

2. The thermoplastic resin of claim 1, wherein said soft rubbery aromatic vinyl copolymer (A) comprises a matrix comprising an aromatic vinyl-vinyl cyanide copolymer; and rubber particles which are dispersed in the matrix and have a graft ratio of about 60 to about 90% and an average particle diameter of about 6 to about 20 μm.

3. The thermoplastic resin of claim 1, wherein said rubber particles include aromatic vinyl monomers, vinyl cyanide monomers, aromatic vinyl-vinyl cyanide copolymer or a mixture thereof occluded therein.

4. The thermoplastic resin of claim 1, wherein said soft rubbery aromatic vinyl copolymer resin (A) comprises about 45 to about 90% by weight of an aromatic vinyl monomer, about 5 to about 35% by weight of a vinyl cyanide monomer, and about 5 to about 20% by weight of a conjugated diene rubber.

5. The thermoplastic resin of claim 1, wherein said soft rubbery aromatic vinyl copolymer resin (A) is prepared by continuous bulk polymerization or continuous solution polymerization.

6. The thermoplastic resin of claim 1, wherein said soft rubbery aromatic vinyl copolymer resin (A) is prepared by:
   mixing 100 parts by weight of a mixed solution comprising about 40 to about 60 parts by weight of an aromatic vinyl monomer, about 10 to about 25 parts by weight of a vinyl cyanide monomer, about 7 to about 20 parts by weight of a conjugated diene rubber, and about 5 to about 30 parts by weight of a solvent with about 0.005 to about 0.03 parts by weight of a polymerization initiator and about 0.005 to about 0.5 parts by weight of a molecular weight control agent;
   polymerizing the mixture to a conversion rate of about 30 to about 40%; and
   further polymerizing the polymerization product to a conversion rate of about 55 to about 80%.

7. The thermoplastic resin of claim 1, wherein said rubber-modified aromatic vinyl copolymer resin (B) is a graft copolymer comprising about 40 to about 80% by weight of a conjugated diene rubber, about 8 to about 45% by weight of an aromatic vinyl monomer, and about 2 to about 30% by weight of a vinyl cyanide monomer, and contains rubber particles having an average particle diameter of about 0.1 to about 0.8 μm.

8. The thermoplastic resin of claim 1, wherein said aromatic vinyl-vinyl cyanide copolymer (C) comprises about 40 to about 90% by weight of an aromatic vinyl monomer and about 10 to 60% by weight of a vinyl cyanide monomer.

9. The thermoplastic resin composition of claim 1, wherein said resin composition further comprises at least one additive selected from the group consisting of flame retardants, thermal stabilizers, impact modifiers, antioxidants, light stabilizers, pigments, dyes, inorganic fillers, and mixtures thereof.

10. The thermoplastic resin composition of claim 4, wherein said aromatic vinyl monomer comprises styrene, α-methyl styrene, 2-methyl styrene, 3-methyl styrene, 4-methyl styrene, 2-ethyl styrene, 3-ethyl styrene, 4-ethyl styrene, 4-n-propyl styrene, 4-t-butyl styrene, 1-vinyl naphthalene, 2-vinyl naphthalene, vinyl toluene, or a combination thereof; said vinyl cyanide monomer comprises acrylonitrile, methacrylonitrile, ethacrylonitrile, or a combination thereof; and said conjugated diene rubber comprises polybutadiene, poly(styrene-butadiene), poly(acrylonitrile-butadiene), isoprene rubbers, chloroprene rubbers, polybutylacrylate, ethylene-propylene-diene terpolymer (EPDM), or a combination thereof.

11. The thermoplastic resin composition of claim 7, wherein said aromatic vinyl monomer comprises styrene, α-methyl styrene, 2-methyl styrene, 3-methyl styrene, 4-methyl styrene, 2-ethyl styrene, 3-ethyl styrene, 4-ethyl styrene, 4-n-propyl styrene, 4-t-butyl styrene, 1-vinyl naphthalene, 2-vinyl naphthalene, vinyl toluene, or a combination thereof; said vinyl cyanide monomer comprises acrylonitrile, methacrylonitrile, ethacrylonitrile, or a combination thereof; and said conjugated diene rubber comprises polybutadiene, poly(styrene-butadiene), poly(acrylonitrile-butadiene), isoprene rubbers, chloroprene rubbers, polybutylacrylate, ethylene-propylene-diene terpolymer (EPDM), or a combination thereof.

12. The thermoplastic resin composition of claim 8, wherein said aromatic vinyl monomer comprises styrene, α-methyl styrene, 2-methyl styrene, 3-methyl styrene, 4-methyl styrene, 2-ethyl styrene, 3-ethyl styrene, 4-ethyl styrene, 4-n-propyl styrene, 4-t-butyl styrene, 1-vinyl naphthalene, 2-vinyl naphthalene, vinyl toluene, or a combination thereof; and said vinyl cyanide monomer comprises acrylonitrile, methacrylonitrile, ethacrylonitrile, or a combination thereof.

13. A molded article molded from the resin composition as defined in claim 1.

14. The thermoplastic resin of claim 1, wherein said soft rubbery aromatic vinyl (A) comprises rubber particles with a graft ratio of about 70 to about 90% and wherein said soft rubbery aromatic vinyl copolymer (A) has a swelling index of about 15 to about 25.

15. The thermoplastic resin of claim 14, wherein said soft rubbery aromatic vinyl (A) comprises rubber particles with a graft ratio of about 70 to about 85% and wherein said soft rubbery aromatic vinyl copolymer (A) has a swelling index of about 16 to about 20.

16. The thermoplastic resin of claim 15, wherein the rubber-modified aromatic vinyl copolymer resin (B) has a graft ratio of about 90 to about 120%.

17. A low gloss thermoplastic resin composition with a soft touch surface consisting essentially of:

(A) about 10 to about 80% by weight of a soft rubbery aromatic vinyl copolymer resin which comprises rubber particles with a graft ratio of about 60 to about 90% and an average particle diameter of about 6 to about 20 μm as a dispersed phase, wherein said soft rubbery aromatic vinyl copolymer (A) has a swelling index of about 13 to about 30;

(B) about 4 to about 60% by weight of a rubber-modified aromatic vinyl copolymer resin; and (C) about 5 to about 80% by weight of an aromatic vinyl-vinyl cyanide copolymer resin, wherein a molded article formed of the composition has an average surface roughness (Ra) of about 400 to about 800 nm and a ten point height (Rz) of about 2,000 to about 7,000 nm and a gloss of about 40 or less measured using a 60 degree gloss meter.

18. The thermoplastic resin of claim 1, wherein a molded article formed of the composition has an Izod impact strength of about 20 to about 30 kgf·cm/cm measured using ⅛" thick specimens and about 17 to about 25 kgf·cm/cm measured using ¼" thick specimens, each in accordance with ASTM D256.

* * * * *

UNITED STATES PATENT AND TRADEMARK OFFICE
CERTIFICATE OF CORRECTION

PATENT NO.       : 9,228,046 B2
APPLICATION NO.  : 12/826992
DATED            : January 5, 2016
INVENTOR(S)      : Jae Keun Hong et al.

It is certified that error appears in the above-identified patent and that said Letters Patent is hereby corrected as shown below:

In the Specification

Column 13, Line 64 reads: "specimens using 6 oz injection molding machine at 180~80°"
and should read: "specimens using 6 oz injection molding machine at 180~280°"

Signed and Sealed this
Twenty-eighth Day of June, 2016

Michelle K. Lee
*Director of the United States Patent and Trademark Office*